(12) United States Patent
Barbi

(10) Patent No.: US 10,455,763 B2
(45) Date of Patent: Oct. 29, 2019

(54) HARVEST ANALYSIS SYSTEM INTENDED FOR USE IN A MACHINE

(71) Applicant: DINAMICA GENERALE S.P.A., Poggio Rusco (MN) (IT)

(72) Inventor: Alberto Barbi, Poggio Rusco (IT)

(73) Assignee: DINAMICA GENERALE S.P.A., Poggio Rusco (IT)

( * ) Notice: Subject to any disclaimer, the term of this patent is extended or adjusted under 35 U.S.C. 154(b) by 0 days.

(21) Appl. No.: 15/668,281

(22) Filed: Aug. 3, 2017

(65) Prior Publication Data

US 2018/0035609 A1    Feb. 8, 2018

(30) Foreign Application Priority Data

Aug. 4, 2016 (IT) ........................ 102016000082338

(51) Int. Cl.
| | | |
|---|---|---|
| *A01D 41/127* | (2006.01) | |
| *G06T 7/00* | (2017.01) | |
| *A01D 43/08* | (2006.01) | |
| *A01D 41/12* | (2006.01) | |
| *A01D 41/14* | (2006.01) | |
| *A01D 41/02* | (2006.01) | |

(52) U.S. Cl.
CPC ..... *A01D 41/1277* (2013.01); *A01D 41/1272* (2013.01); *A01D 43/085* (2013.01); *G06T 7/001* (2013.01); *A01D 41/02* (2013.01); *A01D 41/1208* (2013.01); *A01D 41/14* (2013.01); *G06T 2207/10048* (2013.01); *G06T 2207/30128* (2013.01)

(58) Field of Classification Search
CPC ............ A01D 41/1272; A01D 41/1277; A01D 43/085; A01D 41/02; A01D 41/1208; A01D 41/14; G06T 7/001; G06T 2207/10048; G06T 2207/30128
See application file for complete search history.

(56) References Cited

U.S. PATENT DOCUMENTS

| 5,327,708 A | 7/1994 | Gerrish |
|---|---|---|
| 5,442,552 A * | 8/1995 | Slaughter ............. G05D 1/0246 701/28 |
| 6,119,442 A | 9/2000 | Hale |
| 6,615,570 B2 * | 9/2003 | Beck .................... A01D 41/141 56/10.2 E |

(Continued)

FOREIGN PATENT DOCUMENTS

| DE | 102004063769 A1 | 7/2006 |
|---|---|---|
| DE | 102010017688 A1 | 1/2012 |

(Continued)

*Primary Examiner* — Mekonen T Bekele
(74) *Attorney, Agent, or Firm* — Pearne & Gordon LLP

(57) ABSTRACT

A harvest analysis system, intended to be used in a machine (2, 3) for harvesting agricultural products, e.g. combine (2), forage harvester (3) or the like, comprising at least one image acquisition device (4, 40) and at least one processing unit (1), connected to said acquisition device (4, 40) and in turn comprising:

at least one memory module (10) in which at least a first reference image is stored; and at least one comparison module (11, 12) configured to perform a comparison between the images of the harvested products, acquired by said device (4, 40) and said reference image.

18 Claims, 3 Drawing Sheets

(56) References Cited

U.S. PATENT DOCUMENTS

| | | | |
|---|---|---|---|
| 7,265,831 B2* | 9/2007 | Kormann | G01N 21/274 |
| | | | 250/339.07 |
| 7,804,588 B2 | 9/2010 | Kormann et al. | |
| 7,877,969 B2 | 2/2011 | Behnke | |
| 8,635,840 B2 | 1/2014 | Behnke | |
| 8,831,292 B2 | 9/2014 | Brueckner et al. | |
| 2004/0032973 A1* | 2/2004 | Robeson | A01B 79/005 |
| | | | 382/110 |
| 2006/0093522 A1* | 5/2006 | Kormann | G01N 21/274 |
| | | | 422/82.05 |
| 2007/0056258 A1 | 3/2007 | Behnke | |
| 2008/0186487 A1 | 8/2008 | Kormann et al. | |
| 2012/0004815 A1 | 1/2012 | Behnke | |
| 2013/0059631 A1* | 3/2013 | Claussen | A01D 75/20 |
| | | | 460/2 |
| 2014/0050364 A1 | 2/2014 | Brueckner et al. | |
| 2014/0262547 A1* | 9/2014 | Acheson | A01D 41/1272 |
| | | | 177/1 |
| 2016/0345491 A1* | 12/2016 | Missotten | A01D 34/006 |
| 2017/0039425 A1* | 2/2017 | Itzhaky | G06K 9/00657 |
| 2018/0242523 A1* | 8/2018 | Kirchbeck | A01C 21/005 |
| 2019/0110394 A1* | 4/2019 | VanNahmen | A01D 41/127 |

FOREIGN PATENT DOCUMENTS

| | | |
|---|---|---|
| EP | 1763988 A1 | 3/2007 |
| EP | 1956361 A2 | 8/2008 |
| EP | 2232978 A1 | 9/2010 |
| EP | 2570968 A2 | 3/2013 |
| WO | 9215192 A1 | 9/1992 |

* cited by examiner

HARVEST ANALYSIS SYSTEM INTENDED FOR USE IN A MACHINE

The present invention relates to an analysis system for self-propelled harvesting agricultural machines such as combines, forage harvesters or the like.

It is known that one of the main problems affecting crops for animal or human consumption is contamination from fungi or mould.

In fact, mycotoxins and other toxic agents produced by these contaminants, if swallowed, can cause problems to health, even very severe ones.

Currently, harvesting machines collect both contaminated and healthy products from the fields indiscriminately, which are then stored together, mixing them with one another.

Furthermore, it is known that harvesting using combines or similar machines often causes damage to the grains (caryopses) of products such as corn or other cereals.

Damaged grains, once stored, can be easily attacked by fungi and mould with respect to those that are intact and therefore constitute a further source of contamination of the component used in the diet of dairy and/or meat animals.

The technical task underpinning the present invention is therefore to propose a harvest analysis system, intended for use in a machine for harvesting agricultural products, that overcomes the limits of the prior art. The technical task is attained by the analysis system realized in accordance with claim 1.

Further characteristics and advantages of the present invention will become more apparent from the indicative, and hence non-limiting, description of preferred, but not exclusive, embodiments of the invention, as illustrated in the accompanying drawings, in which.

Figure 1:
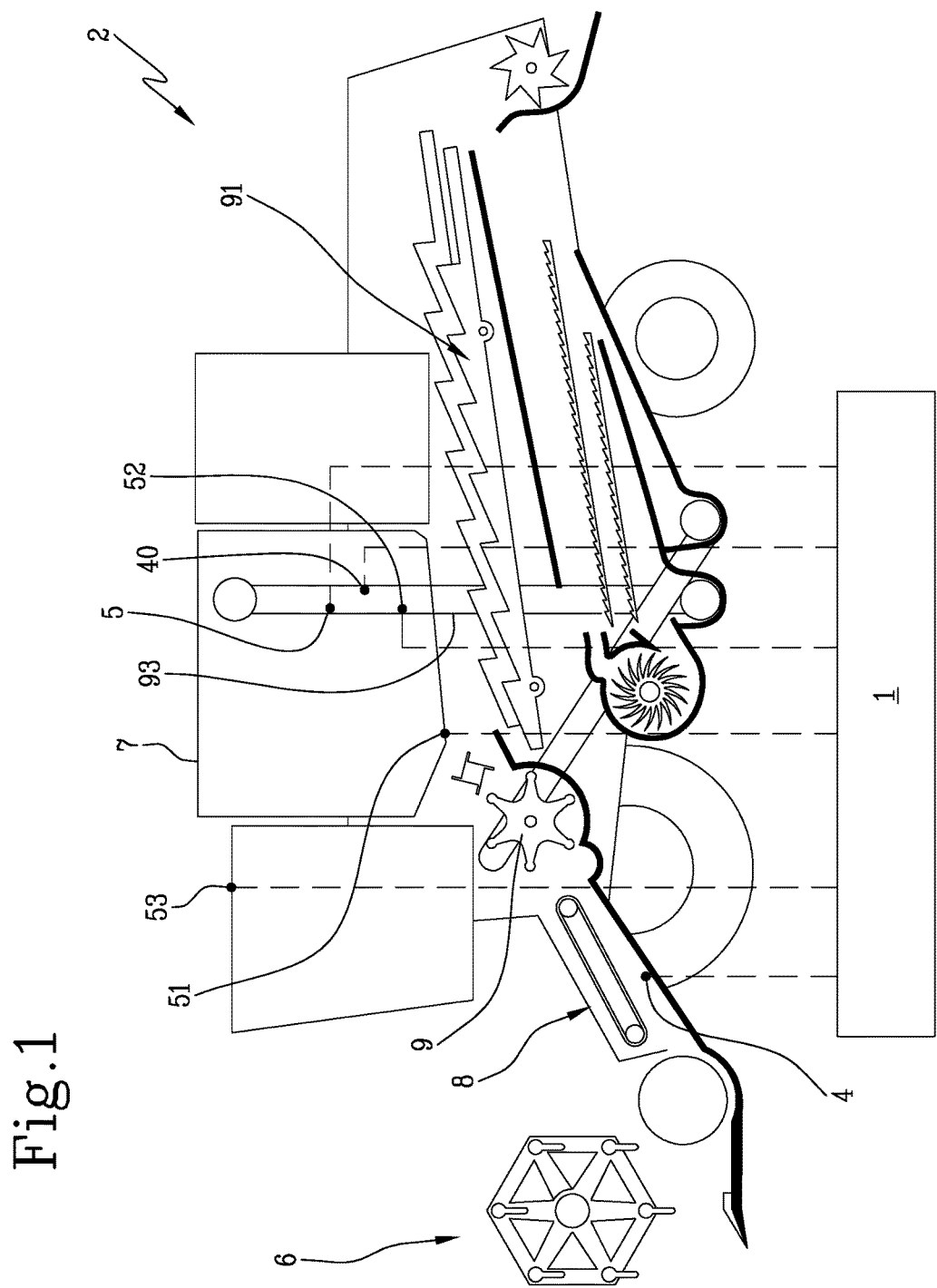
FIG. 1 is the schematic representation of a combine on which the system according to the invention is installed.
Figure 2:
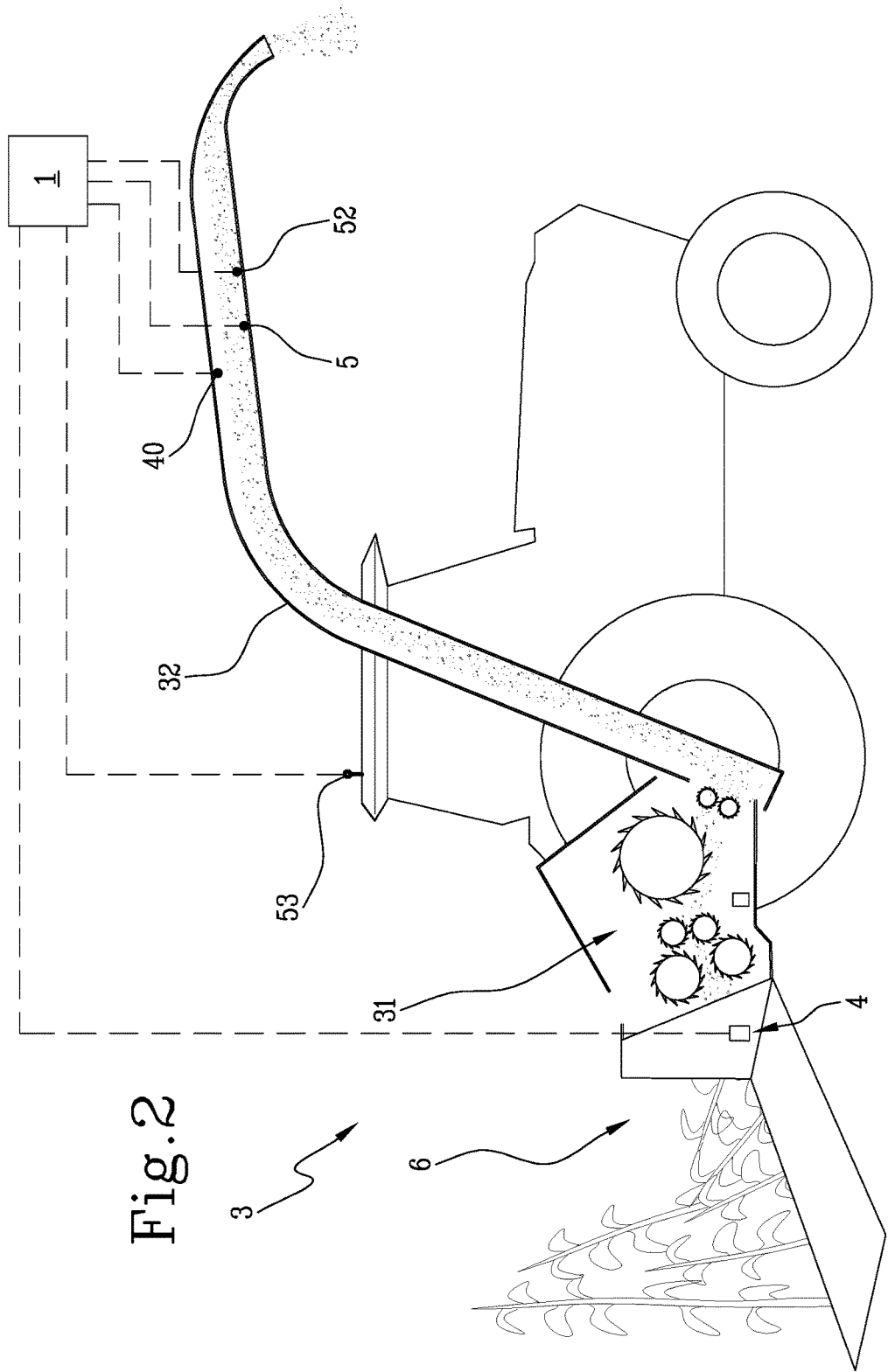
FIG. 2 is the schematic representation of a forage harvester on which the system according to the invention is installed.
Figure 3:
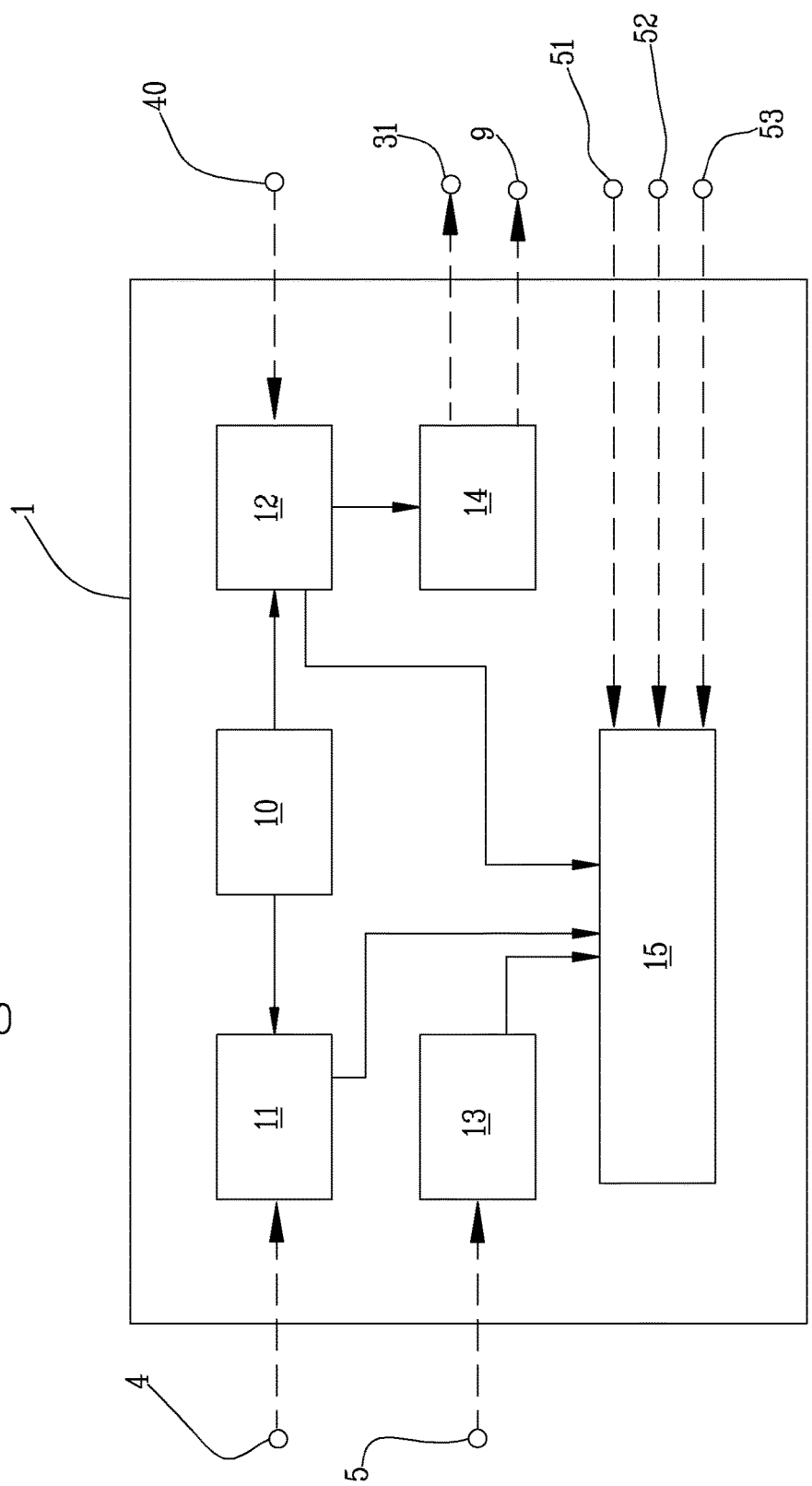
FIG. 3 is a diagram illustrating the processing unit according to the invention.

In the appended figures, a harvest analysis system is shown, intended for use in a self-propelled machine 2, 3 for harvesting agricultural products. Such machine could be a combine 2, a forage harvester 3 or other similar machines.

The system proposed was designed to be mounted on one of said machines 2, 3 either during manufacturing or as an aftermarket improvement.

To be precise, the invention is configured both as a distinct system to be implemented on different machines and as a particular type of harvesting machine that comprises the analysis system proposed.

In detail, the system according to the invention includes at least one processing unit 1 placed on board the machine 2, 3 or in a remote-control unit; both in the former and in the latter case, the processing unit 1 can be connected to the other components of the system either through appropriate cabling, or through wireless communication means, for example through radio-frequency transmission means.

It should be noted that the processing unit 1 is presented below as divided into distinct functional modules (memory modules or operating modules) for the purpose of describing the functions thereof in a clear and complete manner.

In practice, this processing unit 1 can comprise a single electronic device, appropriately programmed to perform the functionalities described, and the different modules can correspond to hardware entities and/or routine software that are part of the programmed device.

Alternatively, or in addition, such functions may be performed by a plurality of electronic devices over which the aforesaid functional modules can be distributed.

The system comprises at least one image acquisition device 4, 40, which can include a digital camera, connected to the processing unit.

The processing unit 1 comprises one or more memory modules 10, in which at least a first reference image is stored which represents a harvested product, for example a cob or a wheat plant or even one or more grains of corn or other cereals, etc.

Furthermore, the processing unit 1 comprises at least one comparison module 11, 12 configured to perform a comparison between the images of the harvested products, acquired by the aforementioned device 4, 40 and the mentioned reference image.

In practice, the system according to the invention was designed to determine the degree of correspondence of the products comprised in the harvest collected by the machine to ideal or "typical" products, represented in the reference images or, on the other hand, observe the presence of fungi through similitude to images of contaminated product.

In particular, but not necessarily, in the memory module 10 a first reference image of a healthy product may be stored, i.e. a product free from fungi or mould.

According to a particular embodiment of the invention, in the memory module 10 a first reference image of a product infested by fungi or mould can be stored.

Therefore, the processing unit 1 includes a first comparison module 11 configured to perform a comparison between the images of the harvested products and the first reference image, hence determining which of the harvested products are healthy and which are contaminated.

To be precise, plants infested by fungi and mould have different morphological and chromatic characteristics from healthy plants.

Therefore, the first comparison module 11 can be configured to use imaging processes to determine the degree of similitude between the first reference image and the images of the harvested products, such imaging procedures also being able to be of the known type, but not in combination with the remaining characteristics of the invention.

In even more detail, the first comparison module 11 can be configured to calculate whether the degree of similitude between each product harvested by the machine (e.g. a corn or maize plant, or even soy and so on) is greater or lower than a decision threshold; such regulation allows the number of false negatives or positives to be minimized.

Furthermore, the memory module 10 may include at least a second reference image that shows an intact and/or non-intact grain (or caryopsis), as happens for the image of the plant.

In this case, the processing unit 1 comprises a second comparison module 12 configured to compare the images of grains of the harvested products with the mentioned second reference image, hence determining which harvested grains are intact and which are damaged.

Similar to what has been mentioned in relation to infested products, damaged grains also present different morphological and chromatic characteristics from intact ones.

Therefore, what has been mentioned in relation to the operating modes of the first comparison module 11 is also valid for the second comparison module 12, mutatis mutandis.

Furthermore, the invention may envisage the use of an NIR device 5 (Near Infra Red), connected to the processing unit 1 and adapted to detect the spectrum of the electromagnetic radiations reflected and/or absorbed by the harvested products.

In this case, the processing unit 1 comprises a composition module 13 configured to determine the chemical composition of the harvested products, based on the relative spectrum detected by the NIR device 5.

In detail, the composition module 13 can be configured to determine the percentage of dry mass and wet mass of the harvested products and of other nutrients such as, by way of example, protein, fat, fibre, or the like; this aspect will be explored in detail below.

In the appended figures, a combine 2 and a forage harvester 3 are shown, which are two types of harvesting machines with which the proposed system is especially intended to cooperate.

The combine 2 is especially used for harvested products intended for human and animal consumption, while the forage harvester 3 is used for harvesting forage mainly intended for animal feed.

The two machines 2, 3 have in common the fact that they include an internal conveyor and processing path for the harvested products, located between cutting and picking means of the harvest 6, arranged in front of the machine 2, 3 and the destination of the picked harvest.

In detail, in the combine 2, the harvest comprises grains (separated from the stalks, leaves and tubules), whose destination is a tank 7 placed on board the machine 2.

In the case of the forage harvester 3, the harvest comprises cut plants, including grains, stalks and tubules, and their destination is typically, but not necessarily, a harvest wagon that travels alongside the forage harvester 3 itself.

To understand the uses of the aforementioned devices according to the invention, as well as other components introduced below, the operation of these two self-propelled harvesting machines is briefly described.

The combine 2 comprises, downstream of the mentioned cutting means, devices 8 for conveying the cut products to a separation device 9, based on whose action the grains are separated from the rest of the plant.

Such separation device may be a so-called "thresher" 9: however, other types of devices suited to the purpose are not excluded.

The different parts of the plant, once separated, are brought into a sieving station 91 of the machine 2, in which they are subject to the action of different separators that allow the grains to be isolated from the useless parts.

The grains are then conveyed by means of an elevator 93 towards the mentioned tank 7, where they accumulate.

The parts that are not brought to the tank 7 are normally ejected from the rear of the machine 2.

Therefore, in the case of the combine 2, the conveyor path starts straight after the cutting means 6, passes through the thresher 9, then through the sieving station 91, through the elevator 92 and ends up in the tank 7.

The forage harvester 3 instead comprises, downstream of the cutting means 6, one or more devices for chopping the plants 31, downstream of which there is a channel 32 (called "spot" in technical jargon), through which the harvest is ejected towards the wagon that travels alongside the forage harvester itself.

Therefore, in the case of the forage harvester 3, the conveyor path of the harvest starts straight downstream of the cutting means 6, continues through chopping devices 31 and proceeds along the spot 32, to its outlet. The invention then envisages a machine for harvesting agricultural products, either a combine 2 or a forage harvester 3 or the like, equipped with an analysis system such as the one described above, having one or more image acquisition devices 4, 40 placed along the conveyor path.

In particular, in the case of application of the system to a combine 2, the first image acquisition device 4 is preferably placed downstream of the cutting means 6 but upstream of the thresher 9.

In practice, the first device 4 acquires the images of the cut products picked before the grains are separated from the rest of the plant.

In this way, the aforementioned first comparison module 11 can check whether the harvested plants have been infested by fungi or mould, by comparing the images of each of them with the image stored in the memory unit 10, according to the methods already discussed above.

In the case of a perfected forage harvester 3, the first acquisition device 4 is located prior to the aforementioned devices for chopping the plants 31. Therefore, the invention makes it possible to find out in real time, i.e. during harvesting, whether the plants are infested and therefore it is possible to decide whether to segregate the harvest affected by fungi or mould in a different place with respect to the healthy harvest.

In practice, thanks to the invention, the discrimination between healthy harvest and contaminated harvest takes place prior to storage, hence overcoming the limits of the prior art.

Preferably, the perfected combine 2 according to the invention then includes a second acquisition device 40, placed along the conveyor path downstream of the thresher 9 but upstream of the tank 7.

Preferably, this second device is placed along the aforementioned elevator 93.

However, a conduit may be provided that connects the elevator 93 and tank 7 adapted to separate the straw from the grains; in this case, the second acquisition device 40 can be placed in such conduit.

In any case, the mentioned second comparison module 12 performs the comparison between the grains conveyed towards the tank 7 and the reference image, so as to be able to determine whether the grains are intact or not.

These precautions allow the operation of the thresher 9 to be regulated in real time so as to avoid damaging the grains.

In fact, the thresher 9 is activated by a motor whose operation is regulated by the control unit of the machine 2, usually already present on this type of agricultural vehicles.

The processing unit 1 may comprise an adjustment module 14 configured to adjust the speed and/or power of the thresher (or device adapted for the physical separation of the grains) 9 based on the determination of the comparison module 11.

Furthermore, the aforementioned NIR device 5 can be arranged in the perfected combine 2 along the elevator 93 or in any case along the conveyor path upstream of the tank 7.

Therefore, the possibility of arranging the NIR device 5 inside the tank 7 is not excluded.

Preferably, the perfected forage harvester 3 according to the invention may be also provided with a second acquisition device 40, in the same way as the perfected combine 2. The second acquisition device 40 can be located downstream of the devices for chopping the plants 31. In the case of the forage harvester 3, the acquisition device 40 is useful for measuring the length and cut of the fibres, for regulating the length of the cut and the degree of crushing of the plants.

In the case of the forage harvester 3, the mentioned second comparison module 12 performs the comparison between the product exiting from the devices for chopping the plants 31 and a reference image, so as to be able to determine whether the cut has been performed according to determined expected parameters. The result of the comparison may be used to retroactively regulate the operation of the devices for chopping the plants 31.

In the perfected forage harvester, the NIR device 5 can be placed along the spot 32.

The invention can include an apparatus 51, 52 for measuring the mass of the harvest, connected to the processing unit 1.

In a variant, the measuring apparatus comprises one or more devices for measuring the weight 51, for example load cells, connected to the tank 7 and adapted to detect the weight of the harvest accumulated in the tank 7 itself.

Additionally, or alternatively, the measuring device may comprise a device for measuring the instantaneous flow of material 52 (for example a magnetically operated flow rate meter) arranged along the conveyor path and adapted to measure the mass of the harvest which crosses the corresponding section of the channel.

Preferably, such flow measuring device 52 is placed in the elevator 93 of the perfected combine 3 or in the mentioned conduit that connects the elevator 93 and the tank 7.

In the perfected forage harvester 3, the device for measuring the flow 52 can be placed along the spot 32.

Preferably, the composition module 13 according to the invention is configured to determine the mass of the dry portion of the harvested product, based on the percentage value determined by the NIR device 5 and the mass as it is (i.e. dry matter plus water) of the harvest determined by the mass measuring apparatus 51, 52 described above.

More generally, the composition module 13 can be configured to determine the mass of at least one nutrient present in the harvest characterized by specific chemical/physical properties.

The invention may then include a geo-locating device 53 (e.g. a GPS receiver) connected to the processing unit 1 and for example positioned above the roof of the cab of the machine 2.

The processing unit 1 may comprise a characterization module 15 configured to associate with one or more parcels of agricultural land a function assessment parameter of the characteristics of the harvest picked by it measured through the NIR and optical sensors 4, 5, 40 through the mass measuring apparatus 51, 52 and georeferenced thanks to the measurements of the device 53, integrated through the processing unit 1 itself.

In practice, the processing unit 1 can be programmed to split the agricultural land from which the machine 2, 3 picks the harvest, into a plurality of parcels.

In this way, a given area of agricultural land, having determined geographical coordinates, can be characterized based on the measurements performed by the system according to the invention while the machine 2, 3 picks the harvest.

In particular, a certain parcel may be characterized based on the level of contamination by fungi or based on the mass of dry matter harvested, the mass of protein harvested and so on.

Therefore, the user of the invention can determine whether, inside the cultivated land, there are areas that need higher doses of fertilizer, for example nitrogen and areas in which savings can be made on the quantity of fertilizer used; the same is valid for the use of pest control agents etc.

In even more detail, the characterization module 15 can be configured to associate with each parcel of the field a characterization parameter as a function of an average value of the specific chemical/physical property considered (e.g. the dry mass).

It can be seen how the invention, thanks to the fact that a plurality of appropriately arranged detecting devices are provided, allows not only the limits affecting the prior art to be overcome, but also allows decisions to be made that lead to the improvement of the quality of crops and, therefore, of the harvest and to optimize the distribution of fertilizers and pesticides, significantly reducing the environmental impact.

The invention claimed is:

1. A combine (2) including a harvest analysis system, the harvest analysis system comprising at least an image acquisition device (4, 40) and at least a processing unit (1) connected to said acquisition device (4, 40) and in turn comprising:
   at least a memory module (10), wherein at least a first reference image is stored; and
   at least a comparison module (11, 12) configured for making a comparison between the images relating to the harvested products acquired by said device (4, 40) and said reference image;
   wherein the combine includes an internal conveyor and processing path for the harvested products, located between cutting and picking means of the harvest (6) and a tank (7);
   wherein the combine comprises, downstream of said cutting means, devices for conveying the cut products to a separation device (9), based on whose action the grains are separated from the rest of the plant for being brought into a sieving station (91) of the combine, in which they are subject to the action of different separators that allow the grains to be isolated from the useless parts and then conveyed by means of an elevator (93) towards said tank (7), where they accumulate;
   wherein said image acquisition device (4) is placed downstream of the cutting means (6) but upstream of the separation device (9);
   wherein the combine includes at least a NIR device (5) connected to the processing unit (1) and able to acquire the spectrum of electromagnetic radiation reflected and/or absorbed by the harvested products, wherein the processing unit (1) comprises a composition module (13) configured for assessing the chemical composition of the harvested products on the basis of the respective spectrum detected by said NIR device (5);
   wherein the NIR device (5) is arranged along the conveyor and processing path upstream of the tank (7).

2. The combine according to claim 1, wherein in said memory module (10) at least a first reference image is stored, which shows a healthy or unhealthy product, said processing unit (1) comprising a first comparison module (11) configured for comparing the images of the harvested products acquired by said acquisition device (40) and said first reference image, thereby determining which of the harvested products are healthy or unhealthy.

3. The combine according to claim 1, wherein in said memory module (10) there is comprised at least a second reference image showing an intact or non-intact grain, said processing unit (1) comprising at least a second comparison module (12) configured to compare the images of grains of the harvested products with said second reference image, thereby determining which grains are intact and which are not intact.

4. The combine according to claim 1, wherein said composition module (13) is configured to determine the percentage of dry mass and wet mass of the harvested products according to the spectrum acquired by the NIR device (5).

5. The combine according to claim 1, comprising at least an apparatus for measuring the harvest mass (51, 52), which apparatus is connected to the processing unit (1).

6. The combine according to claim 5, wherein said apparatus for measuring the harvest mass (51, 52) comprises a device for measuring the weight (51) associated to said tank (7) and capable of detecting the weight of the harvest accumulated therein.

7. The combine according to claim 5, wherein said measuring apparatus (51, 52) comprises a device for measuring the flow of material (52), which device is arranged along the conveyor and processing path and is able to measure the harvest mass that is crossing the conveyor and processing path.

8. The combine according to claim 5, wherein said composition module (13) is configured to determine the mass of at least one portion of the harvest having a specific chemical/physical property.

9. The combine according to claim 1, provided with at least a geo-locating device (53) connected to the processing unit (1), wherein the processing unit (1) comprises at least a characterization module (15) configured to associate, to one or more agricultural land parcels, an evaluation parameter based on characteristics of the products harvested from said agricultural land, said characteristics being determined by the processing unit (1) itself.

10. The combine according to claim 9, wherein the composition module (13) is configured to determine the mass of at least one portion of the harvest having a specific chemical/physical property, and wherein said characterization module (15) is able to associate to each of said agricultural land parcels a parameter that is a function of a mean value of said specific chemical/physical property.

11. A forage harvester (3) including a harvest analysis system, the harvest analysis system comprising at least an image acquisition device (4, 40) and at least a processing unit (1) connected to said acquisition device (4, 40) and in turn comprising:

at least a memory module (10), wherein at least a first reference image is stored; and at least a comparison module (11, 12) configured for making a comparison between the images relating to the harvested products acquired by said acquisition device (4, 40) and said reference image;

wherein the forage harvester includes an internal conveyor and processing path for the harvested products, located between cutting and picking means of the harvest (6) and a harvest wagon that travels alongside the forage harvester;

the harvester comprises, downstream of the cutting means (6), one or more devices for chopping the plants (31), downstream of which there is a channel (32), through which the harvest is ejected towards said wagon that travels alongside the forage harvester itself;

wherein said acquisition device (40) is located downstream of the devices for chopping the plants (31);

wherein the harvester includes at least a NIR device (5) connected to the processing unit (1) and able to acquire the spectrum of electromagnetic radiation reflected and/or absorbed by the harvested products, wherein the processing unit (1) comprises a composition module (13) configured for assessing the chemical composition of the harvested products on the basis of the respective spectrum detected by said NIR device (5);

wherein the NIR device is placed along said channel (32).

12. The forage harvester (3) according to claim 11, wherein in said memory module (10) at least a first reference image is stored, which shows a healthy or unhealthy product, said processing unit (1) comprising a first comparison module (11) configured for comparing the images of the harvested products acquired by said acquisition device (40) and said first reference image, thereby determining which of the harvested products are healthy or unhealthy.

13. The forage harvester (3) according to claim 11, wherein said composition module (13) is configured to determine the percentage of dry mass and wet mass of the harvested products according to the spectrum acquired by the NIR device (5).

14. The forage harvester (3) according to claim 11, comprising at least an apparatus for measuring the harvest mass (51, 52), which apparatus is connected to the processing unit (1).

15. The forage harvester (3) according to claim 14, wherein said measuring apparatus (51, 52) comprises a device for measuring the flow of material (52), which device is arranged along the conveyor and processing path and is able to measure the harvest mass that is crossing the conveyor and processing path.

16. The forage harvester (3) according to claim 14, wherein said composition module (13) is configured to determine the mass of at least one portion of the harvest having a specific chemical/physical property.

17. The forage harvester (3) according to claim 11, provided with at least a geo-locating device (53) connected to the processing unit (1), wherein the processing unit (1) comprises at least a characterization module (15) configured to associate, to one or more agricultural land parcels, an evaluation parameter based on characteristics of the products harvested from said agricultural land, said characteristics being determined by the processing unit (1) itself.

18. The forage harvester (3) according to claim 17, wherein the composition module (13) is configured to determine the mass of at least one portion of the harvest having a specific chemical/physical property, and wherein said characterization module (15) is able to associate to each of said agricultural land parcels a parameter that is a function of a mean value of said specific chemical/physical property.

* * * * *